US 011909055B2

(12) United States Patent
Murata et al.

(10) Patent No.: US 11,909,055 B2
(45) Date of Patent: Feb. 20, 2024

(54) SECONDARY BATTERY

(71) Applicant: Panasonic Corporation, Kadoma (JP)

(72) Inventors: Ichiro Murata, Hyogo (JP); Hiroaki Imanishi, Hyogo (JP)

(73) Assignee: PANASONIC HOLDINGS CORPORATION, Kadoma (JP)

( * ) Notice: Subject to any disclaimer, the term of this patent is extended or adjusted under 35 U.S.C. 154(b) by 512 days.

(21) Appl. No.: 17/277,364

(22) PCT Filed: Jul. 22, 2019

(86) PCT No.: PCT/JP2019/028608
§ 371 (c)(1),
(2) Date: Mar. 18, 2021

(87) PCT Pub. No.: WO2020/066241
PCT Pub. Date: Apr. 2, 2020

(65) Prior Publication Data
US 2021/0359380 A1 Nov. 18, 2021

(30) Foreign Application Priority Data

Sep. 25, 2018 (JP) ................. 2018-179218

(51) Int. Cl.
H01M 50/186 (2021.01)
H01M 50/571 (2021.01)
H01M 50/534 (2021.01)
H01M 50/562 (2021.01)
H01M 50/567 (2021.01)
H01M 50/553 (2021.01)
H01M 50/55 (2021.01)
H01M 50/176 (2021.01)
(Continued)

(52) U.S. Cl.
CPC ....... *H01M 50/186* (2021.01); *H01M 50/176* (2021.01); *H01M 50/534* (2021.01);
(Continued)

(58) Field of Classification Search
None
See application file for complete search history.

(56) References Cited

U.S. PATENT DOCUMENTS

2011/0244309 A1* 10/2011 Byun .................. H01M 50/516
429/158
2016/0118641 A1 4/2016 Oda et al.
(Continued)

FOREIGN PATENT DOCUMENTS

CN 102208591 A 10/2011
CN 102208592 A 10/2011
(Continued)

OTHER PUBLICATIONS

International Search Report dated Oct. 21, 2019, issued in counterpart Application No. PCT/JP2019/028608. (2 pages).
(Continued)

*Primary Examiner* — Wyatt P McConnell
(74) *Attorney, Agent, or Firm* — WHDA, LLP

(57) ABSTRACT

A secondary battery includes an electrode body that includes a positive and a negative electrode plate, a battery case that has an opening in which the electrode body is accommodated, a sealing body that seals the opening, an internal terminal that is disposed on an inner side of the sealing body and connected to the positive or the negative electrode plate, and an external terminal that is disposed on an outer side of the sealing body and connected to the internal terminal. The external terminal includes a rivet that is formed in such a manner as to extend through the sealing body, and the internal terminal includes a first portion made of a first metal (Continued)

and a second portion made of a second metal. The external terminal is made of the second metal, and the rivet of the external terminal is joined to the second portion of the internal terminal.

7 Claims, 3 Drawing Sheets

(51) Int. Cl.
 *H01M 50/586* (2021.01)
 *H01M 50/593* (2021.01)
(52) U.S. Cl.
 CPC ......... *H01M 50/55* (2021.01); *H01M 50/553* (2021.01); *H01M 50/562* (2021.01); *H01M 50/567* (2021.01); *H01M 50/571* (2021.01); *H01M 50/586* (2021.01); *H01M 50/593* (2021.01)

(56) References Cited

U.S. PATENT DOCUMENTS

2017/0054131 A1* 2/2017 Yokota ................ H01M 50/553
2018/0294465 A1* 10/2018 Nagai ............... H01M 10/0525

FOREIGN PATENT DOCUMENTS

| EP | 2372814 A2 | 10/2011 |
| EP | 2375474 A1 | 10/2011 |
| JP | 201181949 A | 4/2011 |
| JP | 2012-123946 A | 6/2012 |
| JP | 2016-85961 A | 5/2016 |
| JP | 2016-143618 A | 8/2016 |
| JP | 2017-123306 A | 7/2017 |

OTHER PUBLICATIONS

English Translation of Chinese Search Report dated Aug. 10, 2022, issued in counterpart CN application No. 201980054599.8. (3 pages).

* cited by examiner

SECONDARY BATTERY

TECHNICAL FIELD

The present invention relates to an electrode structure of a secondary battery.

BACKGROUND ART

When a plurality of secondary batteries are electrically connected to each other in series so as to form an assembled battery, a positive electrode external terminal of one of the secondary batteries and a negative electrode external terminal of the other secondary battery are welded to a busbar. In this case, if the positive electrode external terminal and the negative electrode external terminal are made of dissimilar metals, when a busbar made of a single type of material is welded to these positive and negative electrode external terminals, dissimilar metal welding is performed at one of the external terminals. Dissimilar metal welding may sometimes be difficult to perform depending on the combination of materials. In a case where the negative electrode external terminal and the positive electrode external terminal are respectively made of, for example, copper and aluminum, when a busbar made of copper is welded to the positive electrode external terminal, there is a possibility that the reliability of a welded portion will significantly decrease.

In order to address such a problem, PTL 1 discloses that one of positive and negative electrode external terminals is formed so as to have a clad structure in which a metal material that is the same type as that of the positive electrode external terminal and a metal material that is the same type as that of the negative electrode external terminal are combined. Accordingly, surfaces of the positive and negative electrode external terminals to which a busbar is joined can be made of the same type of metal material as the busbar. As a result, a positive electrode external terminal of one of secondary batteries that are arranged in parallel to each other and a negative electrode external terminal of the other secondary battery can be welded to a busbar made of a single type of material.

CITATION LIST

Patent Literature

PTL 1: Japanese Published Unexamined Patent Application No. 2012-123946

SUMMARY OF INVENTION

External terminals that are provided on the outer side of a sealing body of a battery case are connected to internal terminals (current collectors) that are provided on the inner side of the sealing body via rivets that are provided so as to extend through the sealing body. In addition, the internal terminals are connected to a positive electrode plate and a negative electrode plate via tabs included in the positive electrode plate and the negative electrode plate. In other words, members (one of the tabs, one of the internal terminals, and one of the rivets) that form a current path extending from the positive electrode plate to one of the external terminals that has a positive polarity are made of the same type of metal, and members (the other tab, the other internal terminal, and the other rivet) that form a current path extending from the negative electrode plate to the other external terminal that has a negative polarity are made of the same type of metal. The members forming the current path on the positive electrode side are usually made of aluminum or an aluminum alloy (hereinafter simply referred to as "aluminum"), and the members forming the current path on the negative electrode side are usually made of copper or a copper alloy (hereinafter simply referred to as "copper").

However, aluminum has a higher electric resistance and a lower thermal conductivity than copper, and thus, the following problems occur particularly when the positive rivet is made of aluminum.

The rivet is inserted through a through hole formed in the sealing body and is clinched so as to be fixed to the sealing body with a gasket interposed therebetween. Accordingly, a clinched portion of the rivet is thin and has a high electric resistance, and thus, its temperature is likely to become high. In addition, since aluminum has a low thermal conductivity, its heat dissipation rate is slow. Consequently, a problem occurs in that gasket, which is disposed in the vicinity of the clinched portion of the rivet, sustains thermal damage. A problem of such thermal damage becomes more obvious especially when a high-capacity battery is quick-charged.

The present invention has been made in view of the above problems, and it is a main object of the present invention to provide a secondary battery that enables welding of a positive electrode external terminal of one of secondary batteries arranged in parallel to each other and a negative electrode external terminal of the other secondary battery to a busbar made of a single type of material and that is capable of suppressing heat generation in a current path and reducing thermal damage to a gasket.

A secondary battery according to the present invention includes an electrode body that includes a positive electrode plate and a negative electrode plate, a battery case that has an opening and in which the electrode body is accommodated, a sealing body that seals the opening, an internal terminal that is disposed on an inner side of the sealing body and connected to the positive electrode plate or the negative electrode plate, and an external terminal that is disposed on an outer side of the sealing body and connected to the internal terminal. The external terminal includes a rivet that is formed in such a manner as to extend through the sealing body. The internal terminal includes a first portion made of a first metal and a second portion made of a second metal. The external terminal is made of a second metal, and the rivet of the external terminal is joined to the second portion of the internal terminal.

According to the present invention, a secondary battery can be provided that enables welding of a positive electrode external terminal of one of secondary batteries arranged in parallel to each other and a negative electrode external terminal of the other secondary battery to a busbar made of a single type of material and that is capable of suppressing heat generation in a current path and reducing thermal damage to a gasket.

DESCRIPTION OF EMBODIMENTS

Embodiments of the present invention will be described in detail below with reference to the drawings. Note that the present invention is not limited to the following embodiments. Changes may be suitably made as long as advantageous effects of the present invention are obtained.

Figure 1:
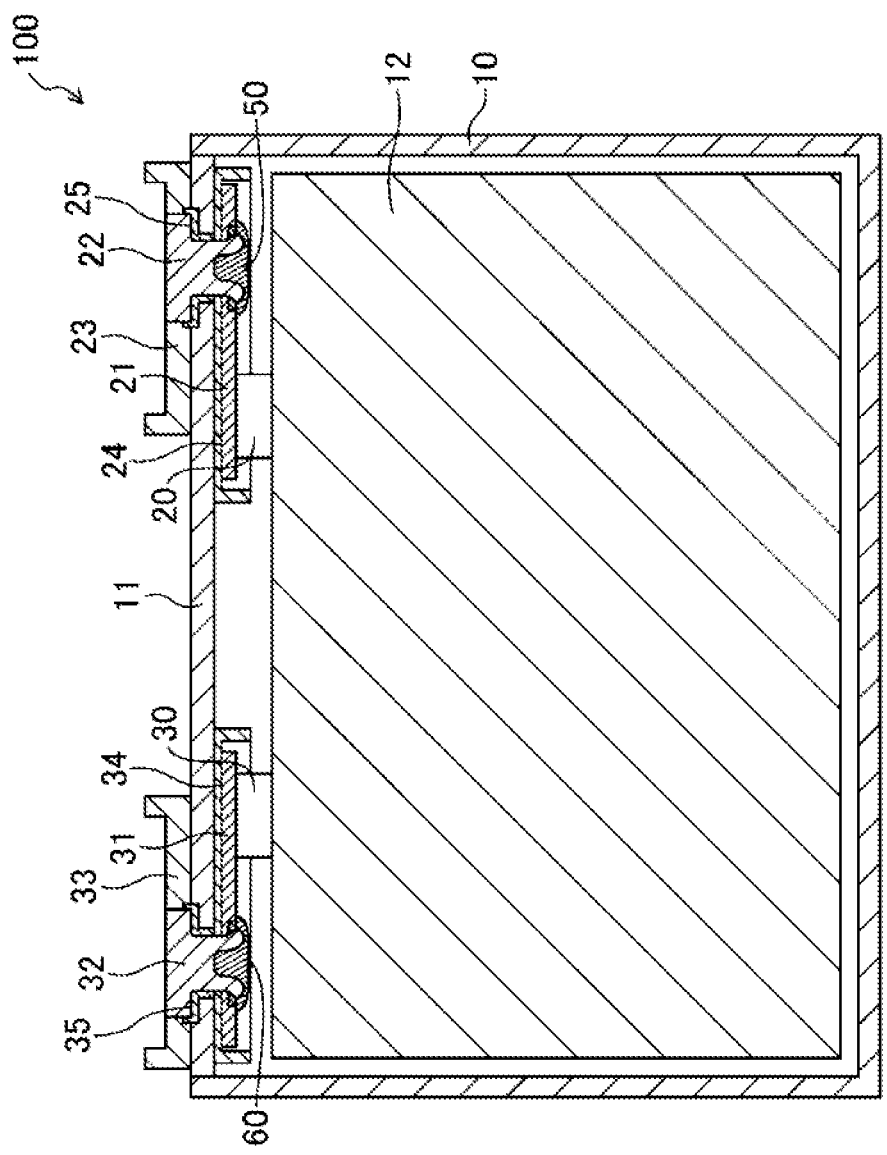
FIG. 1 is a diagram schematically illustrating a configuration of a secondary battery in an embodiment of the present invention.

FIG. 1 is a diagram schematically illustrating a configuration of a secondary battery 100 in an embodiment of the present invention.

As illustrated in FIG. 1, in the secondary battery 100 in the present embodiment, an electrode body 12, which is a power generating element, is accommodated in a battery case 10 together with an electrolyte solution. An opening of the battery case 10 is sealed with a sealing body 11. Here, the electrode body 12 has a structure in which a positive electrode plate and a negative electrode plate, which are not illustrated, are stacked one on top of the other or wound with a separator (not illustrated) interposed therebetween.

The positive electrode plate includes a positive electrode core body and a positive electrode active material layer that includes a positive electrode active material and that is formed on a surface of the positive electrode core body. The negative electrode plate includes a negative electrode core body and a negative electrode active material layer that includes a negative electrode active material and that is formed on a surface of the negative electrode core body. In addition, a positive electrode tab 20 that is formed of the positive electrode core body extends from a side portion of the positive electrode plate toward the sealing body 11, and a negative electrode tab 30 that is formed of the negative electrode core body extends from a side portion of the negative electrode plate toward the sealing body 11. Note that the positive electrode core body is made of aluminum, and the negative electrode core body is made of copper.

A positive electrode internal terminal 21 is disposed on the inner side of the sealing body 11 with an insulating plate 24 interposed between the positive electrode internal terminal 21 and the sealing body 11, and a negative electrode internal terminal 31 is disposed on the inner side of the sealing body 11 with an insulating plate 34 interposed between the negative electrode internal terminal 31 and the sealing body 11. In addition, the positive electrode tab 20 and the negative electrode tab 30 are respectively connected to the positive electrode internal terminal 21 and the negative electrode internal terminal 31 by, for example, ultrasonic bonding or laser welding.

A positive electrode external terminal 22, 23 and a negative electrode external terminal 32, 33 are arranged on the outer side of the sealing body 11. Note that, in the present embodiment, the positive electrode external terminal is formed of a positive electrode rivet 22 that is formed so as to extend through the sealing body 11 and a busbar connection terminal 23 that is connected to the positive electrode rivet 22 and that is disposed on an outer portion of the sealing body 11. Similarly, the negative electrode external terminal is formed of a negative electrode rivet 32 that is formed so as to extend through the sealing body 11 and a busbar connection terminal 33 that is connected to the positive electrode rivet 32 and that is disposed on an outer portion of the sealing body 11.

The positive electrode rivet 22 is inserted into holes that are formed in the sealing body 11, the insulating plate 24, and the positive electrode internal terminal 21 such that a gasket 25 is interposed between the positive electrode rivet 22 and the sealing body 11, and then an end portion of the positive electrode rivet 22 is clinched so as to be fixed to the sealing body 11 together with the other members. The negative electrode rivet 32 is inserted into holes that are formed in the sealing body 11, the insulating plate 34, and the negative electrode internal terminal 31 such that a gasket 35 is interposed between the positive electrode rivet 32 and the sealing body 11, and then an end portion of the positive electrode rivet 32 is clinched so as to be fixed to the sealing body 11 together with the other members.

Figure 2:
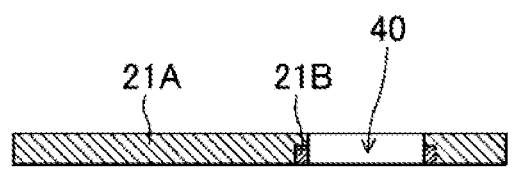
FIG. 2(a) and FIG. 2(b) are respectively a sectional view and a plan view each schematically illustrating a configuration of a positive electrode internal terminal.
Figure 2:
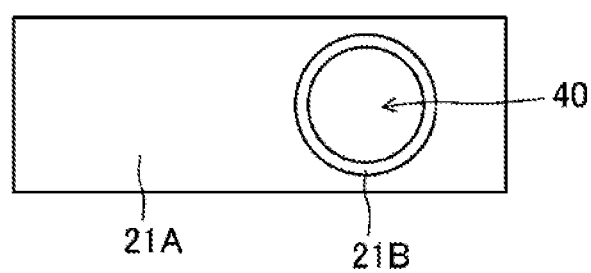

FIG. 2(*a*) and FIG. 2(*b*) are respectively a sectional view and a plan view each schematically illustrating the configuration of the positive electrode internal terminal 21.

As illustrated in FIG. 2(*a*) and FIG. 2(*b*), the positive electrode internal terminal 21 has a hole 40 into which the positive electrode rivet 22 is inserted. In addition, the positive electrode internal terminal 21 includes a first portion 21A made of aluminum (a first metal) and a second portion 21B made of copper (a second metal). In other words, the positive electrode internal terminal 21 has a clad structure. In the present embodiment, the second portion 21B is formed in a surface of the positive electrode internal terminal 21, the surface facing the electrode body 12, along the peripheral edge of the hole 40 so as to have a ring-like shape. Note that the first portion 21A and the second portion 21B can be bonded together by, for example, diffusion bonding.

Figure 3:
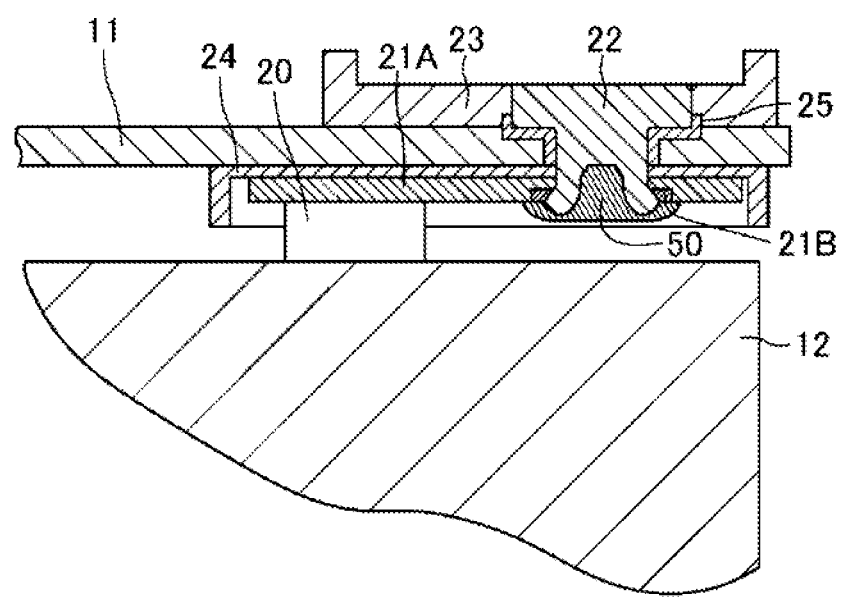
FIG. 3 is a diagram illustrating, in an enlarged manner, an electrode structure on a positive electrode side in the secondary battery illustrated in FIG. 1.

FIG. 3 is a diagram illustrating, in an enlarged manner, an electrode structure on the positive electrode side in the secondary battery 100 illustrated in FIG. 1.

Although the positive electrode rivet 22 is usually made of aluminum, which is the same material as the positive electrode core body, in the present embodiment, the positive electrode rivet 22 is made of copper (the second metal), which is the same material as the negative electrode core body. Here, as illustrated in FIG. 3, the positive electrode rivet 22 is clinched so as to be fixed to the sealing body 11 together with the positive electrode internal terminal 21, and a clinched portion of the positive electrode rivet 22 and the second portion 21B of the positive electrode internal terminal 21 are laser-welded together for the purpose of reducing the electric resistance. Here, since the positive electrode rivet 22 and the second portion 21B of the positive electrode internal terminal 21 are both made of copper, welding of components made of the same type of metal is performed, and thus, the strength of a welded portion can be ensured.

In the present embodiment, the busbar connection terminal 23 is also made of copper (the second metal). Accordingly, the positive electrode rivet 22 and the busbar connection terminal 23 can be joined together by laser welding, that is, welding of components made of the same type of metal, and thus, the strength of a welded portion can be ensured.

In contrast, the members that form a current path on the negative electrode side, which are the negative electrode internal terminal 31, the negative electrode rivet 32, and the busbar connection terminal 33, are made of copper (the second metal), which is the same material as the negative electrode core body. Accordingly, laser welding of the negative electrode internal terminal 31 and the negative electrode rivet 32 and laser welding of the negative electrode rivet 32 and the busbar connection terminal 33 are both laser welding of components made of the same type of metal, and thus, the strength of welded portions can be ensured.

In addition, in the present embodiment, the busbar connection terminal 23 on the positive electrode side is made of copper, which is the same material as the busbar connection terminal 33 on the negative electrode side, and thus, a positive electrode external terminal of one of secondary batteries that are arranged in parallel to each other and a negative electrode external terminal of the other secondary battery can be welded to a busbar made of a single type of material (copper). As a result, when an assembled battery is formed by electrically connecting a plurality of secondary batteries to each other by using a busbar, the strength of a joint portion between the secondary batteries, which are arranged in parallel to each other, can be ensured.

Note that, as in the related art, by forming one of positive and negative electrode external terminals such that the external terminal has a clad structure in which a metal material that is the same type as that of the positive electrode external terminal and a metal material that is the same type as that of the negative electrode external terminal are combined, a positive electrode external terminal of one of secondary batteries that are arranged in parallel to each other and a negative electrode external terminal of the other secondary battery can be welded to a busbar made of a single type of material. However, since the external terminals are arranged on the outer side of a sealing body, a positive electrode rivet and a negative electrode rivet, which are formed in such a manner as to extend through the sealing body, are each made of a metal that is the same as that of the corresponding members that are arranged on the inner side of the sealing body so as to form the corresponding current path. Thus, the positive electrode rivet 22 is inevitably made of aluminum, which is the same material as the positive electrode internal terminal 21.

In contrast, in the present embodiment, the positive electrode internal terminal provided on the inner side of the sealing body 11 is formed so as to have a clad structure in which a metal material (aluminum) that is the same type as that of the members forming the current path on the positive electrode side and a metal material (copper) that is the same type as that of the members forming the current path on the negative electrode side are combined, so that the positive electrode rivet 22 can be made of copper, which is the same material as the negative electrode rivet 32.

As described above, in the present embodiment, the busbar connection terminal 23 on the positive electrode side of one of secondary batteries that are arranged in parallel to each other and the busbar connection terminal 33 on the negative electrode side of the other secondary battery can be welded to a busbar made of a single type of material (copper).

In addition, since the positive electrode rivet 22 can be made of copper, heat generation in the current path can be suppressed, and thermal damage to the gasket 25, which is disposed in the vicinity of the clinched portion of the positive electrode rivet 22, can be reduced. Thermal damage to the gasket can be markedly reduced especially when a high-capacity battery is quick-charged.

In the case where a portion of the members forming the current path on the positive electrode side is made of copper and exposed on the inner side of the sealing body 11, there is a possibility that, within a positive electrode operating potential range, the exposed copper portion will become corroded as a result of coming into contact with the electrolyte solution and will be dissolved in the electrolyte solution. Accordingly, in the present embodiment, as illustrated in FIG. 3, a portion in which the positive electrode rivet 22 and the second portion 21B of the positive electrode internal terminal 21 are exposed on the inner side of the sealing body 11 is covered with an insulating member 50 that is resistant to the electrolyte solution. As a result, the exposed copper portion can be prevented from becoming corroded as a result of coming into contact with the electrolyte solution and being dissolved in the electrolyte solution.

The insulating member 50, which is resistant to the electrolyte solution, can be formed by, for example, applying an ultraviolet-ray-curing resin to the exposed copper portion and then radiating ultraviolet rays onto the ultraviolet-ray-curing resin so as to solidify the ultraviolet-ray-curing resin. Alternatively, the insulating member 50 may be formed by capping the portion in which the positive electrode rivet 22 and the second portion 21B of the positive electrode internal terminal 21 are exposed with a stopper made of rubber or made of a resin.

Another Embodiment

In the above-described embodiment, although the positive electrode rivet 22 is made of copper in order to reduce thermal damage to the gasket 25 disposed in the vicinity of the clinched portion of the positive electrode rivet 22, the negative electrode rivet 32 may be made of aluminum in order to reduce the weight of the secondary battery and the manufacturing costs of the secondary battery.

Figure 4:
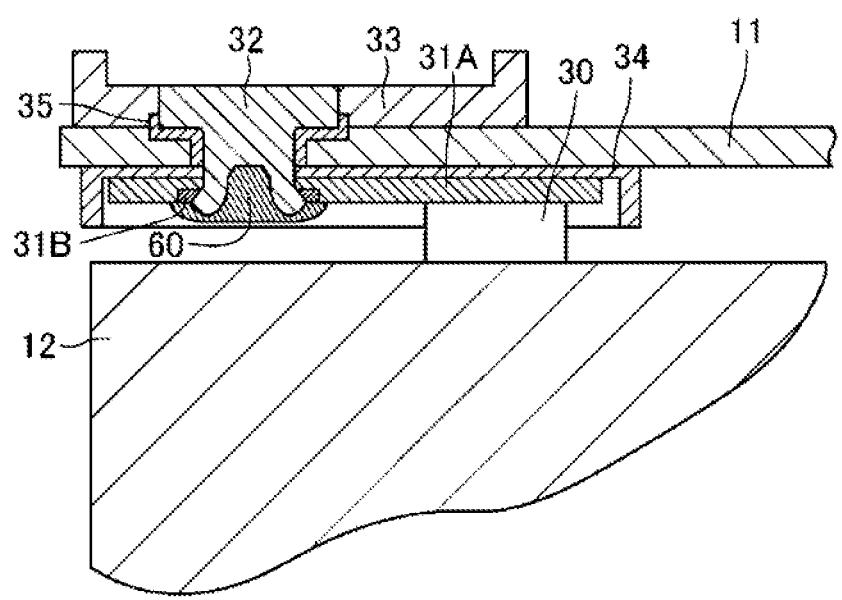
FIG. 4 is a diagram illustrating, in an enlarged manner, an electrode structure on a negative electrode side in a secondary battery in another embodiment of the present invention.

FIG. 4 is a diagram schematically illustrating a configuration of a secondary battery in another embodiment of the present invention and illustrating, in an enlarged manner, an electrode structure on the negative electrode side.

In the present embodiment, the negative electrode internal terminal 31 has a hole into which the negative electrode rivet 32 is inserted as illustrated in FIG. 2(a) and FIG. 2(b). In addition, the negative electrode internal terminal 31 includes a first portion 31A made of copper (the first metal) and a second portion 31B made of aluminum (the second metal). In other words, the negative electrode internal terminal 31 has a clad structure. In the present embodiment, the second portion 31B is formed in a surface of the negative electrode internal terminal 31, the surface facing the electrode body 12, along the peripheral edge of the hole so as to have a ring-like shape. Note that the first portion 31A and the second portion 31B can be bonded together by, for example, diffusion bonding.

As illustrated in FIG. 4, although the negative electrode rivet 32 is usually made of copper, which is the same material as the negative electrode core body, in the present embodiment, the negative electrode rivet 32 is made of aluminum, which is the same material as the positive electrode core body. Here, the negative electrode rivet 32 is clinched so as to be fixed to the sealing body 11 together with the negative electrode internal terminal 31, and a clinched portion of the negative electrode rivet 32 and the second portion 31B of the negative electrode internal terminal 31 are welded together by laser welding. Here, since the negative electrode rivet 32 and the second portion 31B of the negative electrode internal terminal 31 are both made of aluminum, welding of components made of the same type of metal is performed, and thus, the strength of a welded portion can be ensured.

In the present embodiment, the busbar connection terminal 33 is also made of aluminum (the second metal). Accordingly, laser welding of the negative electrode rivet 32 and the busbar connection terminal 33 is welding of components made of the same type of metal, and thus, the strength of a welded portion can be ensured.

In contrast, the members forming the current path on the positive electrode side, which are the positive electrode internal terminal 21, the positive electrode rivet 22, and the busbar connection terminal 23, are made of aluminum (the second metal), which is the same material as the positive electrode core body. Accordingly, laser welding of the positive electrode internal terminal 21 and the positive electrode rivet 22 and laser welding of the positive electrode rivet 22 and the busbar connection terminal 23 are both laser welding of components made of the same type of metal, and thus, the strength of welded portions can be ensured.

In the present embodiment, the busbar connection terminal 33 on the negative electrode side is made of aluminum, which is the same type of metal as the busbar connection terminal 23 on the positive electrode side, and thus, a positive electrode external terminal of one of secondary batteries that are arranged in parallel to each other and a negative electrode external terminal of the other secondary battery can be welded to a busbar made of a single type of material (aluminum). As a result, when an assembled battery is formed by electrically connecting a plurality of secondary batteries to each other by using a busbar, the strength of a joint portion between the secondary batteries, which are arranged in parallel to each other, can be ensured.

In addition, the negative electrode rivet 32 and the busbar connection terminal 33 on the negative electrode side can be made of aluminum that is cheaper and lighter than copper, and thus, a reduction in the manufacturing costs of the secondary battery and a reduction in the weight of the secondary battery can be achieved.

In the case where a portion of the members forming the current path on the negative electrode side is made of aluminum and exposed on the inner side of the sealing body 11, there is a possibility that, within a negative electrode operating potential range, the exposed aluminum portion will react with lithium present in the electrolyte solution as a result of coming into contact with the electrolyte solution and will form a lithium-aluminum alloy. Accordingly, in the present embodiment, as illustrated in FIG. 4, a portion in which the negative electrode rivet 32 and the second portion 31B of the negative electrode internal terminal 31 are exposed on the inner side of the sealing body 11 is covered with an insulating member 60 that is resistant to the electrolyte solution. As a result, the exposed aluminum can be prevented from being alloyed with lithium.

Although the preferred embodiments of the present invention have been described above, the descriptions are not intended to limit the scope of the invention, and it is obvious that various modifications can be made. For example, in the above-described embodiments, the positive electrode external terminal is formed of the rivet 22 and the busbar connection terminal 23, and the negative electrode external terminal is formed the rivet 32 and the busbar connection terminal 33. However, the positive electrode external terminal may be formed of only the rivet 22, and the negative electrode external terminal may be formed of only the rivet 32. In other words, in the present invention, each of the external terminals may at least include a corresponding one of the rivets 22 and 32, each of which is formed so as to extend through the sealing body 11. Note that, in this case, the positive electrode rivet 22 of one of secondary batteries that are arranged in parallel to each other and the negative electrode rivet 32 of the other secondary battery are welded to a busbar made of a single type of material.

In addition, in the above-described embodiments, as illustrated in FIG. 1, although the clinched portion of the positive electrode rivet 22 and the clinched portion of the negative electrode rivet 32 are arranged on the side on which the internal terminal 21 and the internal terminal 31 are disposed, these clinched portions may be arranged on the side on which the sealing body 11 is disposed.

In the secondary battery according to the present invention, one of the internal terminals 21 and 31 that is connected to one of the positive electrode plate and the negative electrode plate includes the first portion 21A or 31A made of the first metal and the second portion 21B or 31B made of the second metal. One of the external terminals that is connected to the one of the internal terminals 21 and 31 is made of the second metal, and the rivet 22 or 32 of the external terminal is joined to the second portion 21B or 31B of the one of the internal terminals 21 and 31. The other of the internal terminals 21 and 31 that is connected to the other of the positive electrode plate and the negative electrode plate is made of the second metal. The other of external terminals that is connected to the other of the internal terminals 21 and 31 is made of the second metal, and the rivet 22 or 32 of the external terminal is joined to the other of the internal terminals 21 and 31.

The type of the secondary battery according to the present invention is not particularly limited and can be applied to, for example, a lithium-ion secondary battery, a nickel-hydrogen secondary battery, and so forth. In addition, the structure of the electrode body 12 is not particularly limited. Furthermore, commonly known materials can be used for the positive electrode, the negative electrode, the separator, the electrolyte solution and so forth.

REFERENCE SIGNS LIST 10 battery case
11 sealing body
12 electrode body
20 positive electrode tab
21 positive electrode internal terminal
21A first portion
21B second portion
22 positive electrode rivet
23 busbar connection terminal
24, 34 insulating plate
25, 35 gasket
30 negative electrode tab
31 negative electrode internal terminal
31A first portion
31B second portion
32 negative electrode rivet
33 busbar connection terminal
40 hole
50, 60 insulating member
100 secondary battery

The invention claimed is:
1. A secondary battery comprising:
an electrode body that includes a positive electrode plate and a negative electrode plate;
a battery case that has an opening and in which the electrode body is accommodated;
a sealing body that seals the opening;
an internal terminal that is disposed on an inner side of the sealing body and connected to the positive electrode plate or the negative electrode plate; and
an external terminal that is disposed on an outer side of the sealing body and connected to the internal terminal,
wherein the external terminal includes a rivet that is formed in such a manner as to extend through the sealing body, wherein the internal terminal includes a first portion made of a first metal and a second portion made of a second metal, and wherein the external terminal is made of the second metal, and the rivet of the external terminal is joined to the second portion of the internal terminal.

2. The secondary battery according to claim 1,
wherein a portion in which the rivet and the first portion are exposed on the inner side of the sealing body is covered with an insulating member that is resistant to an electrolyte solution.

3. The secondary battery according to claim 1,
wherein the internal terminal is connected to the positive electrode plate or the negative electrode plate via a tab that is included in the positive electrode plate or the negative electrode plate and that is made of the first metal.

4. The secondary battery according to claim 1,
wherein the external terminal further includes a busbar connection terminal that is connected to the rivet and that is disposed on an outer portion of the sealing body.

5. The secondary battery according to claim 1,
wherein one of the internal terminals that is connected to one of the positive electrode plate and the negative electrode plate includes the first portion made of the first metal and the second portion made of the second metal, wherein one of the external terminals that is connected to the one of the internal terminals is made of the second metal and joined to the second portion of the one of the internal terminals at the rivet, wherein another one of the internal terminals that is connected to another one of the positive electrode plate and the negative electrode plate is made of the second metal, and wherein another one of the external terminals that is connected to the other one of the internal terminals is made of the second metal and joined to the other one of the internal terminals at the rivet.

6. The secondary battery according to claim 5,
wherein the one of the positive electrode plate and the negative electrode plate is a positive electrode plate,
wherein the first metal is made of aluminum or an aluminum alloy, and
wherein the second metal is made of copper or a copper alloy.

7. The secondary battery according to claim 5,
wherein the other one of the positive electrode plate and the negative electrode plate is a negative electrode plate,
wherein the first metal is made of copper or a copper alloy, and
wherein the second metal is made of aluminum or an aluminum alloy.

\* \* \* \* \*